Aug. 11, 1925. Re. 16,133

E. A. SMITHFIELD

CASTER BRACKET SOCKET

Original Filed Jan. 3, 1921 2 Sheets-Sheet 1

INVENTOR.
EMIL A. SMITHFIELD.

BY Lostrom & Lostrom

ATTORNEYS.

Aug. 11, 1925. Re. 16,133

E. A. SMITHFIELD

CASTER BRACKET SOCKET

Original Filed Jan. 3, 1921 2 Sheets-Sheet 2

INVENTOR.
EMIL A. SMITHFIELD.

BY Lockwood & Lockwood
ATTORNEYS.

Reissued Aug. 11, 1925. Re. 16,133

UNITED STATES PATENT OFFICE.

EMIL A. SMITHFIELD, OF EVANSVILLE, INDIANA, ASSIGNOR TO FAULTLESS CASTER COMPANY, OF EVANSVILLE, INDIANA, A CORPORATION.

CASTER BRACKET SOCKET.

Original No. 1,383,773, dated July 5, 1921, Serial No. 434,506, filed January 3, 1921. Application for reissue filed July 2, 1923. Serial No. 649,104.

*To all whom it may concern:*

Be it known that I, EMIL A. SMITHFIELD, a citizen of the United States, and a resident of Evansville, county of Vanderburg, and State of Indiana, have invented a certain new and useful Caster Bracket Socket; and I do hereby declare that the following is a full, clear, and exact description thereof, reference being had to the accompanying drawings, in which like numerals refer to like parts.

This invention relates to caster sockets, and means for securing the same to supporting legs, members or the like.

The chief object of this invention is to provide means whereby a caster socket may be secured to and supported by a supporting leg or other member not adapted to receive the customary caster socket such that said leg or supporting member may be provided with a caster.

Another feature of the invention consists in forming a caster socket and means for securing the same to the supporting leg or member from an integral piece of metal.

Another feature of the invention is the provision of bracket wings associated with the caster socket such that the caster socket may be suitably supported upon an inclined supporting leg or member, or may be suitably supported upon an angular leg or member or any other peculiarly shaped leg or member.

A further feature of the invention consists in providing that the cap portion of the socket is extended to form a gripping tongue; and still a further feature of the invention is the provision of suitable flaps associated with the cap portion to reinforce the same.

Still a further feature of the invention consists in forming the bracket wings such that the same, if and when desired, may be secured yieldingly upon the supporting leg.

Figure 1:
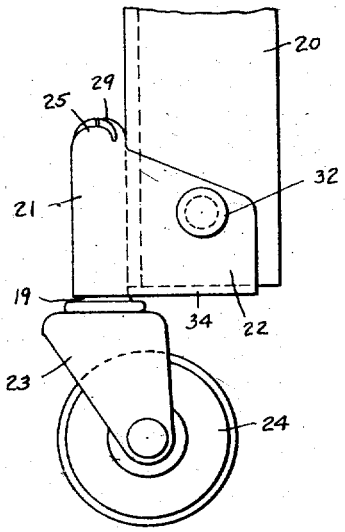
Figure 2:
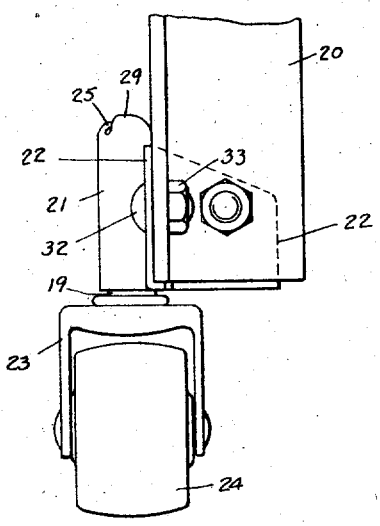
Figure 3:
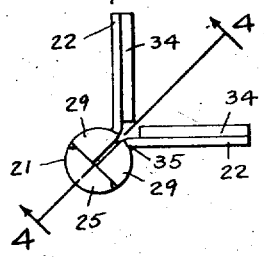
Figure 4:
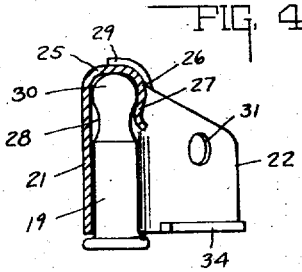
Figure 5:
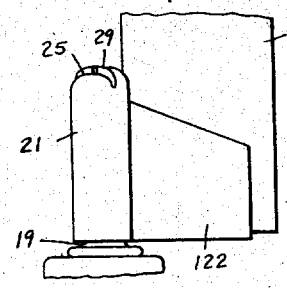
Figure 6:
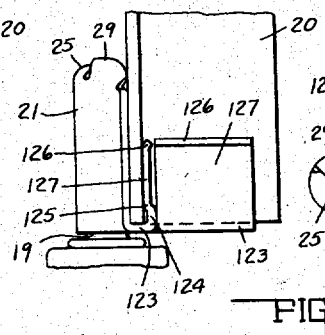
Figure 7:
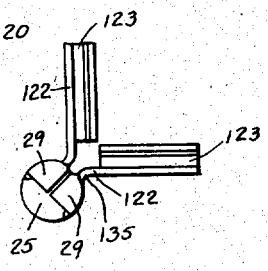
Figure 8:
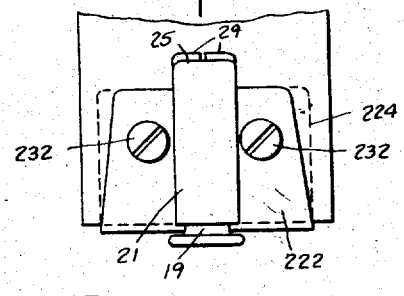
Figure 9:
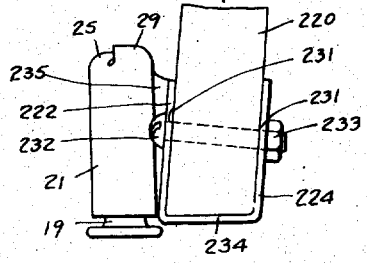
Figure 10:
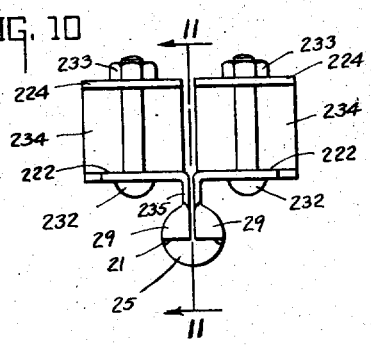
Figure 11:
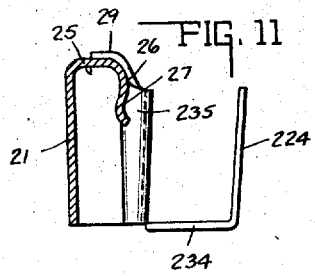

The full nature of the invention will be understood from the accompanying drawings and the following description and claims:

In the drawings, Figure 1 is an elevational view of one form of the caster bracket socket showing the same associated with an angular leg or supporting member and a caster. Fig. 2 is a similar view of the same taken at right angles to the view of Fig. 1. Fig. 3 is a top plan view of the invention with the leg and caster removed. Fig. 4 is a sectional view of the invention taken on the line 4—4 of Fig. 3 to illustrate three features of the invention in detail. Fig. 5 is an elevational view of a modified form of the invention and illustrates another means of securing the caster socket to an angular support. Fig. 6 is a view similar to Fig. 5 and is taken at right angles to said view. Fig. 7 is a top plan view of the invention shown in Figs. 5 and 6 with the angular leg removed. Fig. 8 is an elevational view of another modified form of the invention showing the same associated with an inclined supporting leg. Fig. 9 is a view similar to Fig. 8 and of the same parts and is taken in a plane at right angles to said figure. Fig. 10 is a top plan view of the invention shown in Figs. 8 and 9 with the inclined supporting leg removed therefrom. Fig. 11 is a central sectional view taken on the line 11—11 of Fig. 10 and in the direction of the arrows.

In the drawings, 20 indicates a supporting leg or member of angular form, such as a piece of angle iron, and associated therewith is the caster socket comprising a cylindrical portion 21 and a bracket or wing supporting portion 22 by which said socket portion is secured to the angularly shaped leg. The socket 21 is adapted to receive a stem 19 to support the caster yoke 23, which in turn supports the usual caster roller 24. In certain household articles such as washing machines and the like, the same have not been provided with casters when said household articles were manufactured, and one of the purposes of this invention is to provide a caster bracket socket which may be attached to substantially any form of supporting leg, such as usually is found upon washing machines and other articles of household use. In the washing machine art the legs of the machines frequently are of wood, and when not of wood, preferably are of iron, in turn preferably angle iron. In Figs. 1 to 4, inclusive, the invention is illustrated as applied to an angle iron leg such that the socket may be rigidly secured thereto, and as will be noted from said figures, said bracket is adapted to be associated with substantially any size of angle iron leg. In Figs. 5 to 7, inclusive, the socket is shown associated with substantially the same kind of angular leg, but as illustrated in said figures, the socket is adapted to be yieldingly associated with the supporting leg, thereby making it possible for the housewife to readily apply the bracket supported socket to the household article, such as a washing machine or other similar article. In Figs. 8 to 11, inclusive, the modification illustrated is shown to be associated with an inclined leg or supporting member, and in the usual washing machines, said legs are made of wood and of insufficient cross section to receive the usual caster socket heretofore associated with wooden legs, and, therefore, the invention is illustrated as associated with said inclined leg, and it will be noted that the same is so constructed that while the leg is inclined to the vertical, the caster stem will nevertheless be vertically positioned in the caster socket.

Before proceeding to a description of the particular means for securing the socket to the supporting leg or stem, which means has been broadly indicated in the preceding paragraph, the particular construction of the socket will be described, since said socket is substantially similar in all forms of the bracket socket. The socket is preferably formed from an integral piece of sheet metal stamped and swaged by suitable die means or any other means such that a portion thereof forms the cylindrical body portion 21 of the caster socket, and this cylindrical caster socket is adapted to receive the caster stem 19 and rotatably support the same. In the present invention a portion of the cylindrical body portion is bent or drawn from one side over the end of the cylindrical socket to substantially close the same, as indicated clearly in Figs. 3 and 4, and this cap-forming flap 25 in the present instance is extended downwardly and inwardly within the cylindrically formed body portion to form a tongue 26. The tongue 26 is bent inwardly and then outwardly, as at 27, to form a retaining spring which is adapted to fit in the neck 28 of the caster stem 19 and yieldingly retain the caster stem in the cylindrical socket. The cylindrical body portion adjacent the cap or end-forming flap portion is provided with the additional flaps 29 shown clearly in Figs. 2, 3 and 4. The flaps 29 are so formed that the same are adapted to reinforce the cap-forming flap 25 and be positioned adjacent each other so as to support each other and the cap forming flaps adjacent the weakest portion of the cap-forming portion of said flap, thereby insuring that the head closure means of the caster socket will be of sufficient strength to receive and support the caster head 30 without the same destroying said head closure means. It will be understood that in the several forms herein illustrated, all of the sockets are formed in substantially the same manner, and, therefore, a description of the one herein given is equally applicable to the others.

In Figs. 1 to 4, inclusive, the means for attaching the improved socket to the supporting leg, which as hereinbefore stated is of angle iron, comprises a pair of wings or brackets 22 which extend angularly of the cylindrical body portion, and in the present instance is formed integral therewith. The cylindrical body portion as clearly illustrated in the several figures, is composed of one piece of sheet metal formed into the shape disclosed, and the substantially abutting longitudinal edges are continued outwardly and extend in opposite directions from each other in the present instance. To the outwardly extending angularly positioned bracket wings integral with the cylindrical socket portion 21 is secured the angle iron leg. Each wing 22 in this modification is provided with a bolt or screw receiving opening 31 and suitable bolt and nut means 32 and 33 respectively associating the wing bracket 22 with the leg 20 by means of the opening 31. It will, of course, be understood that when a wooden leg is used, the bolt 32 and nut 33 may be replaced by a suitable screw.

In order to take the strain from the securing means hereinbefore described, each of the wings in all of the modifications preferably is shown provided with a supporting flange portion which extends angularly of and preferably at right angles to the wing portion 22 and the socket axis. This angular supporting flange portion is indicated by the numerals 34 in Figs. 1 to 4, inclusive, and as shown in said figures is integral with the wing bracket 22. As shown in Figs. 1 to 4, inclusive, the wing brackets 22 are preferably positioned at right angles to each other to receive an angle iron or square shaped leg. Without departing from the broader features of the invention, it will, of course, be understood that but one bracket wing may be provided, but two preferably are used to secure strength and rigidity.

Reference will now be had to Figs. 5 to 7, inclusive, respectively. In said figures the cylindrical socket 21 is formed in substantially the same manner as that hereinbefore described, with reference to Figs. 1 to 4, inclusive, and the wing brackets 122 are substantially similar and formed in a similar manner to those illustrated in Figs. 1 to 4, inclusive, but are therein indicated by the numeral 22. Similarly, the angularly extending supporting portion or flange 123 is substantially similar to that indicated by the numeral 24 in the before-mentioned figures. However, the modification illustrated in Figs. 5 to 7, inclusive, differs from that indicated in Figs. 1 to 4, inclusive, by providing means for yieldingly securing the caster socket to a supporting leg, such as the angle iron 20, as shown. In order to yieldingly support said angle iron leg, the supporting flange 123 is preferably turned upwardly at 124 and the upwardly turned portion 124 is preferably bent inwardly at 125, and the free end thereof is bent outwardly at 126 to provide a spring portion 127 intermediate said bent portions 125 and 126. The spring portion 127 yieldingly secures or locks the angle iron in the angularly positioned wings 122 and the angularly extending flange portion 123 supports said angle iron.

As clearly shown in Figs. 3 and 7, each of the wing brackets while integral with the cylindrical socket portion 21 is necessarily connected thereto by means of an intermediate portion 35 and 135, respectively. However, in Figs. 8 to 11, inclusive, said connecting portion indicated by the numeral 235 in said last mentioned figures instead of being substantially negligible, as indicated by the preceding figures, is of considerable size and is also adapted to position the angularly extending wings 222 in an inclined position with relation to the axis of the socket, thereby forming the bracket to be attached to an inclined leg. It will, of course, be understood that in the modifications illustrated in Figs. 1 to 7, inclusive, said connecting portions 35 and 135 may be of similar importance when the supporting legs are inclined to the vertical. However, with the foregoing explanation, it is not deemed necessary to illustrate this modification combined with the modifications illustrated in Figs. 1 to 7, inclusive.

As previously stated, the socket 21 is substantially similar to that illustrated and described in detail with reference to Figs. 1 to 4, inclusive, and also in Figs. 5 to 7, inclusive. In the present instance the supporting wings 222 instead of being angularly positioned with respect to each other, in this instance are positioned in substantially the same plane, although said wings are positioned angularly with respect to the longitudinal axis of said cylindrical socket portion. Extending angularly of each of said wings 222 is the usual supporting flange portion 234, which is similar to the supporting portions 34 and 123 in function, and in being positioned at substantially at right angles to the axis of the cylindrical socket. In this modification of the invention, the flanged portion 234 is turned upwardly to form an upwardly extending portion 224 substantially similar in function to that of the portion 124 illustrated in Figs. 5 to 7, inclusive. In this modification, however, instead of the upwardly extending portion 224 being suitably bent to form a spring portion for yieldingly attaching the same to the supporting leg, said upwardly extending portion 224 and the wing portion 222 are each provided with an opening 231, see Fig. 9, which register with each other such that the same are adapted to receive a bolt 232 which extends through the stave or wooden leg 220 to secure the same in assembled relation by means of the nut 233. The upwardly extending portion 224 is similar to the upwardly extending portion 124 in that the same lines parallel with the wing portions 222 and 122, respectively.

While the invention has been described in great detail in the foregoing specifications, it will be understood that many modifications thereof will readily suggest themselves to those skilled in the art, and these modifications, as well as the many suggested or illustrated in the foregoing specifications are all considered to be within the broad purview of the invention as set forth in the appended claims.

The invention claimed is:

1. A caster socket formed from one piece of metal, shaped into a cylindrical body portion having a single longitudinal opening, and a flap integral with said body portion opposite said opening and curved toward said opening to form an end cap, said flap extending downwardly with said cylindrical body portion adjacent the longitudinal opening to form a retaining member for the caster stem.

2. A caster socket formed from one piece of metal, shaped into a cylindrical body portion having a single longitudinal opening, a flap integral with said body portion opposite said opening and curved toward said opening to form an end cap, said flap extending downwardly within said cylindrical body portion adjacent the longitudinal opening to form a retaining member for the caster stem, and other flap means integral with the cylindrical body portion and curved inwardly to lie in superposed relation with said first mentioned cap forming flap to reinforce the same.

3. A caster socket comprising a cylindrical body portion, flap means integral with said body portion and curved to form an end closure for said cylindrical socket, and a pair of flaps associated with the cylindrical body portion curved to lie adjacent said first-mentioned flap to reinforce the same.

4. A unitary caster bracket socket comprising a cylindrical body portion, flap means integral with said body portion and curved inwardly to form an end closure cap, and a wing bracket extending angularly of said cylindrical body portion and integral therewith and adapted to be secured to a supporting member.

5. A unitary caster bracket socket comprising a cylindrical body portion, flap means integral with said body portion and curved inwardly to form an end closure cap, a wing bracket extending angularly of said cylindrical body portion and integral therewith and adapted to be secured to a supporting member, and a supporting flange integral with the wing bracket adapted to be associated with said supporting member and extending angularly of the wing bracket.

6. A unitary caster bracket socket comprising a cylindrical body portion, flap means integral with said body portion and curved inwardly to form an end closure cap, a wing bracket extending angularly of said cylindrical body portion and integral therewith and adapted to be secured to a supporting member, a supporting flange integral with the wing bracket adapted to be associated with said supporting member and extending angularly of the wing bracket, and means extending upwardly from said angularly extending flange and integral therewith for securing said socket to the supporting member.

7. A unitary caster bracket socket comprising a cylindrical body portion, flap means integral with said body portion and curved inwardly to form an end closure cap, a wing bracket extending angularly of said cylindrical body portion and integral therewith and adapted to be secured to a supporting member, a supporting flange integral with the wing bracket adapted to be associated with said supporting member and extending angularly of the wing bracket, and means extending angularly of said angularly extending flange and integral therewith and parallel to the wing bracket for yieldingly securing said bracket socket to the supporting member.

8. A unitary caster bracket socket comprising a cylindrical body portion, flap means integral with said body portion and curved inwardly to form an end closure cap, other flap means integral with said cylindrical body portion and curved so that the same is adapted to lie adjacent the cap-forming flap means to reinforce the same, and a wing bracket extending angularly of said cylindrical body portion and integral therewith and adapted to be secured to the supporting member.

9. A unitary caster bracket socket comprising a cylindrical body portion, flap means integral with said body portion and curved inwardly to form an end closure cap, other flap means integral with said cylindrical body portion and curved so that the same is adapted to lie adjacent the cap-forming flap means to reinforce the same, a wing bracket extending angularly of said cylindrical body portion and integral therewith and adapted to be secured to the supporting member, and a supporting flange integral with the wing bracket adapted to be associated with said supporting member and extending angularly of the wing bracket.

10. A unitary caster bracket socket comprising a cylindrical body portion, flap means integral with said body portion and curved inwardly to form an end closure cap, other flap means integral with said cylindrical body portion and curved so that the same is adapted to lie adjacent the cap-forming flap means to reinforce the same, a wing bracket extending angularly of said cylindrical body portion and integral therewith and adapted to be secured to the supporting member, a supporting flange adapted to be associated with said supporting member and extending angularly of the wing bracket and integral therewith, and means extending upwardly from said angularly extending flange and integral therewith for securing said socket to the supporting member.

11. A unitary caster bracket socket comprising a cylindrical body portion, a flap integral with said body portion and curved inwardly to form an end closure cap, said cap-forming flap extending downwardly and inwardly to form a caster stem retaining member, and a wing bracket extending angularly of said cylindrical body portion and integral therewith and adapted to be secured to a supporting member.

12. A unitary caster bracket socket comprising a cylindrical body portion, a flap integral with said body portion and curved inwardly to form an end closure cap, said cap-forming flap extending downwardly and inwardly to form a caster stem retaining member, a wing bracket extending angularly of said cylindrical body portion and integral therewith and adapted to be secured to a supporting member, and a supporting flange integral with the wing bracket adapted to be associated with said supporting member and extending angularly of the wing bracket.

13. A unitary caster bracket socket comprising a cylindrical body portion, a flap integral with said body portion and curved inwardly to form an end closure cap, said cap-forming flap extending downwardly and inwardly to form a caster stem retaining member, a wing bracket extending angularly of said cylindrical body portion and integral therewith and adapted to be secured to a supporting member, a supporting flange adapted to be associated with said supporting member and extending angularly of the wing bracket and integral therewith, and means extending upwardly from said angularly extending flange and integral therewith for securing said socket to the supporting member.

14. A unitary caster bracket socket comprising a cylindrical body portion, a flap integral with said body portion and curved inwardly to form an end closure cap, said cap-forming flap extending downwardly and inwardly to form a caster stem retaining member, flap means integral with said cylindrical body portion and curved so that the same is adapted to lie adjacent the cap-forming flap to reinforce the same, and a wing bracket extending angularly of said cylindrical body portion and integral therewith and adapted to be secured to a supporting member.

15. A unitary caster bracket socket comprising a cylindrical body portion, a flap integral with said body portion and curved inwardly to form an end closure cap, said cap-forming flap extending downwardly and inwardly to form a caster stem retaining member, flap means integral with said cylindrical body portion and curved so that the same is adapted to lie adjacent the cap-forming flap to reinforce the same, and a supporting flange integral with the body portion adapted to be associated with said supporting member.

16. A unitary caster bracket socket comprising a cylindrical body portion, a flap integral with said body portion and curved inwardly to form an end closure cap, said cap-forming flap extending downwardly and inwardly to form a caster stem retaining member, flap means integral with said cylindrical body portion and curved so that the same is adapted to lie adjacent the cap-forming flap to reinforce the same, a supporting flange adapted to be associated with said supporting member and extending angularly of the wing bracket, and means extending upwardly from said angularly extending flange for securing said socket to the supporting member.

17. A unitary caster bracket socket comprising a cylindrical body portion, a flap integral with said body portion and curved inwardly to form an end closure cap, said cap-forming flap extending downwardly and inwardly to form a caster stem retaining member, flap means integral with said cylindrical body portion and curved so that the same is adapted to lie adjacent the cap-forming flap to reinforce the same, a wing bracket extending angularly of the cylindrical body portion and integral therewith and adapted to be secured to a supporting member, and a supporting flange integral with the wing bracket and adapted to be associated with the supporting member.

18. A unitary caster bracket socket comprising a cylindrical body portion, a flap integral with said body portion and curved inwardly to form an end closure cap, said cap-forming flap extending downwardly and inwardly to form a caster stem retaining member, flap means integral with said cylindrical body portion and curved so that the same is adapted to lie adjacent the cap forming flap to reinforce the same, a wing bracket extending angularly of the cylindrical body portion and integral therewith and adapted to be secured to a supporting member, a supporting flange integral with the wing bracket and adapted to be associated with the supporting member, and means extending upwardly from said angularly extending flange and integral therewith for securing said socket to the supporting member.

19. A caster bracket socket comprising a cylindrical body portion, a wing bracket extending angularly thereof, an intermediate connecting portion securing said wing to said body portion, said connecting portion extending longitudinally of said body portion, a flange extending angularly of said wing bracket for supporting a supporting member, and means extending upwardly from said angularly extending flange and in spaced relation with the wing for securing the caster socket to a supporting member.

20. A caster bracket socket comprising a cylindrical body portion, a wing extending angularly thereof and adapted to be secured to a supporting member, a flange extending angularly of said wing and transversely of said cylindrical socket, and means extending upwardly from said transversely positioned flange for securing said socket to a supporting member.

21. A caster bracket socket comprising a cylindrical body portion formed from a single piece of sheet metal providing adjacent longitudinal edges, and a pair of bracket wings extending angularly of said cylindrical socket portion and extending outwardly from each other and connected to said cylindrical socket at the longitudinal edges.

22. A caster bracket socket comprising a cylindrical body portion formed from a single piece of sheet metal providing adjacent longitudinal edges, and a pair of bracket wings extending angularly of said cylindrical socket portion and extending outwardly from each other and connected to said cylindrical socket at the longitudinal edges, each of said wings being provided with a flange extending angularly of said wing portion for supporting a supporting member.

23. A caster bracket socket comprising a cylindrical body portion formed from a single piece of sheet metal providing adjacent longitudinal edges, a pair of bracket wings extending angularly of said cylindrical socket portion and extending outwardly from each other and connected to said cylindrical socket at the longitudinal edges, each of said wings being provided with a flange extending angularly of said wing portion for supporting a supporting member, and means extending upwardly therefrom adjacent the wing for securing said bracket to said supporting member.

24. In a caster bracket socket comprising a cylindrical body portion, a plurality of wings extending angularly of the socket and angularly of each other and adapted to be secured to a supporting member, flange means associated with each of the angularly extending wings and adapted to support said supporting member, and upwardly extending means associated with said supporting flange means and in spaced relation with said wing means for securing said socket to the supporting member.

25. The combination of a multi-sided iron leg and a single sheet metal member forming a caster bracket socket therefor including a caster supporting tubular portion, and a plurality of clamping anchorages integral therewith, each anchorage comprising a wing adapted to lie adjacent one face of a side of said leg, a portion integral with the wing and extending beneath the leg for supporting the same, and an upturned portion integral with the leg supporting portion and clampingly engaging the opposite face of the leg side and exposing the entire lateral edge of the leg adjacent said bracket.

26. The combination of a multi-sided iron leg and a single sheet metal member forming a caster bracket socket therefor including a caster supporting tubular portion, and a plurality of portions integral with said tubular portion and having lateral engagement with the leg, one of said portions being adapted to lie adjacent one face of a side of said leg, another portion integral with said last mentioned adjacent portion and extending beneath the leg for supporting the same and for securing the first mentioned lateral engagement, and an upturned portion integral with said laterally extending leg supporting portion and clampingly engaging the opposite face of the leg side and exposing the lateral edge of the leg adjacent the said clamping arrangement.

In witness whereof, I have hereunto affixed my signature.

EMIL A. SMITHFIELD.